US008736120B2

(12) United States Patent
Maeda et al.

(10) Patent No.: US 8,736,120 B2
(45) Date of Patent: May 27, 2014

(54) OLDHAM COUPLING, MANUFACTURING PROCESS THEREOF, COUPLING PROCESS OF SHAFTS BY OLDHAM COUPLING AND ELECTRIC MOTOR INCLUDING OLDHAM COUPLING

(71) Applicant: Fanuc Corporation, Yamanashi (JP)

(72) Inventors: Takuya Maeda, Yamanashi (JP); Isao Kariya, Yamanashi (JP)

(73) Assignee: Fanuc Corporation, Minamitsuru-Gun, Yamanashi (JP)

( * ) Notice: Subject to any disclaimer, the term of this patent is extended or adjusted under 35 U.S.C. 154(b) by 0 days.

(21) Appl. No.: 13/790,453

(22) Filed: Mar. 8, 2013

(65) Prior Publication Data
US 2013/0257233 A1 Oct. 3, 2013

(30) Foreign Application Priority Data

Mar. 28, 2012 (JP) ................. 2012-075049

(51) Int. Cl.
H02K 7/00 (2006.01)
(52) U.S. Cl.
USPC ......................... 310/75 D; 464/104
(58) Field of Classification Search
USPC ................. 310/75 D, 68 D, 68 B; 464/104
See application file for complete search history.

(56) References Cited

U.S. PATENT DOCUMENTS 5,226,852 A * 7/1993 Asaba et al. ................. 464/104
5,583,630 A 12/1996 Kimura et al.
6,504,276 B2 * 1/2003 Yamamura .................. 310/75 D
6,517,439 B1 * 2/2003 Sears ........................... 464/104
2004/0157666 A1 * 8/2004 Taniguchi et al. ............ 464/104
2009/0230825 A1 * 9/2009 Braun et al. ................ 310/75 D
2012/0210816 A1 * 8/2012 Izumi ......................... 74/490.03

FOREIGN PATENT DOCUMENTS

| DE | 102006043897 A1 | 3/2008 |
| DE | 102010054510 A1 | 6/2012 |
| JP | 63-289324 A | 11/1988 |
| JP | 3-079814 A | 4/1991 |
| JP | 08-145067 A | 6/1996 |
| JP | 2000-120715 A | 4/2000 |
| JP | 3602404 A | 12/2004 |
| JP | 2007-285356 A | 11/2007 |
| JP | 2008-185205 A | 8/2008 |
| JP | 4161365 A | 10/2008 |

OTHER PUBLICATIONS

Corresponding Japanese Application No. 2012-075049 Notice of Reasons for Rejection dated May 14, 2013.
Office Action dated Dec. 2, 2013, corresponds to German patent application No. 102013004888.5.

* cited by examiner

Primary Examiner — Hanh Nguyen
(74) Attorney, Agent, or Firm — Lowe Hauptman & Ham, LLP

(57) ABSTRACT

An Oldham coupling includes a first coupling part, a second coupling part and an intermediate part. The first coupling part and the second coupling part are coupled to each other with the intermediate part provided therebetween. The first coupling part and the second coupling part are fitted on fitting portions of the intermediate part extending perpendicular to each other. The first coupling part, the second coupling part and the intermediate part have fitting indication portions. The fitting indication portions allow a positional relationship between the first coupling part and the second coupling part about a rotational axis to be determined.

8 Claims, 14 Drawing Sheets (a)        (b)        (c)

(a)    (b)

(a)    (b)

(a)    (b)    (c)

OLDHAM COUPLING, MANUFACTURING PROCESS THEREOF, COUPLING PROCESS OF SHAFTS BY OLDHAM COUPLING AND ELECTRIC MOTOR INCLUDING OLDHAM COUPLING

RELATED APPLICATIONS

The present application is based on, and claims priority from, Japanese Application Number 2012-075049, filed Mar. 28, 2012, the disclosure of which is hereby incorporated by reference herein in its entirety.

BACKGROUND OF THE INVENTION

1. Field of the Invention

This invention relates to an Oldham coupling for an electric motor, a manufacturing process thereof, a coupling process of shafts by the Oldham coupling, and an electric motor including the Oldham coupling.

2. Description of the Related Art

An Oldham coupling for transmitting rotational power between two rotational members whose rotational axes are eccentric is known (see JP-A-63-289324, JP-A-3-79814, JP-B-3602404, JP-2007-285356, and JP-B-4161365). The Oldham coupling includes a pair of coupling parts which are connected to rotational shafts, respectively. The Oldham coupling also includes an intermediate part which is slidably fitted to the coupling parts. The coupling parts are fitted to a fitting portion in the form of a protrusion or a groove on both end surfaces of the intermediate part, respectively. The two fitting portions extend perpendicular to each other. Since the coupling parts are slidably fitted to the intermediate part, respectively, in the case where the two rotational shafts are eccentric to each other, the intermediate part moves relative to each coupling part so as to compensate the amount of eccentricity. With such a feature of the Oldham coupling, it is advantageous that greater allowance in the amount of eccentricity can be ensured.

In general, two coupling parts of an Oldham coupling are fitted on fitting portions of an intermediate part extending perpendicular to each other, and therefore, a positional relationship between the coupling parts about a rotational axis is predetermined. This is advantageous to, for example, a synchronous electric motor in which a relationship between a reference position of a rotational shaft of the electric motor and a reference position of a rotational shaft of a detector needs to be determined. When an Oldham coupling is used to connect an electric motor and a detector to each other, attaching/detaching one of the coupling parts to/from the rotational shaft can be carried out independently of the other of the coupling parts. Therefore, attachment and exchange processes can be advantageously facilitated.

However, in some cases, it may be inappropriate to apply the Oldham coupling to a synchronous electric motor because of the structural characters of the Oldham coupling. The fitting portions of the intermediate part generally have an elongated shape extending through the center of the intermediate part. Such fitting portions have a symmetric shape in plan view relative to a given line extending through the center of the intermediate part. Therefore, the coupling part and the intermediate part can be mechanically fitted to each other when the coupling part is rotated relative to the intermediate part by every 180 degrees. On the other hand, it is necessary for a synchronous electric motor to precisely detect rotational angular positions of the electric motor in order to supply windings with electric current at an appropriate phase. Accordingly, it is necessary to determine a positional relationship between the electric motor and the detector about a rotational axis, in which their referential positions correspond to each other. However, it is possible to assemble the Oldham coupling with only one of the two coupling parts rotated by 180 degrees from its reference position. If this is the case, rotational angular positions may be erroneously detected by 180 degrees for some electric motors, resulting in electric current at an inappropriate phase being supplied to windings. In order to avoid this from occurring, an additional process is required to check and adjust, if necessary, the phases of the electric motor and the detector when the Oldham coupling is used for this purpose.

According to the present invention, an Oldham coupling can be provided in which it is ensured that the coupling parts are connected to each other in a desired positional relationship by allowing the Oldham coupling to determine a positional relationship between the coupling parts. According to the present invention, a manufacturing process for manufacturing such an Oldham coupling can also be provided. Further, according to the present invention, a coupling process for coupling a rotational shaft of an electric motor to a rotational shaft of a detector by way of such an Oldham coupling can be provided.

SUMMARY OF THE INVENTION

According to a first aspect, an Oldham coupling including a first coupling part fixed to a rotational shaft of an electric motor, a second coupling part fixed to a rotational shaft of a detector for detecting information on rotational movement of the electric motor, and an intermediate part provided between the first coupling part and the second coupling part, the intermediate part including a pair of fitting portions extending perpendicular to each other, the fitting portion on one end surface of the intermediate part being fitted on the first coupling part, the fitting portion on the other end surface of the intermediate part being fitted on the second coupling part, is provided. The first coupling part, the second coupling part, and the intermediate part of the Oldham coupling have a fitting indication portion for determining a positional relationship between the first coupling part and the second coupling part about a rotational axis.

According to a second aspect, in the Oldham coupling according to the first aspect, the fitting indication portions of the first coupling part and of the second coupling part are defined by shapes of the first coupling part and of the second coupling part for fitting on the fitting portions of the intermediate part, respectively, and the fitting indication portions of the intermediate part are defined by shapes of the pair of fitting portions.

According to a third aspect, in the Oldham coupling according to the first or second aspect, the fitting indication portions of the first coupling part and of the second coupling part are protrusions or recesses on the first coupling part and on the second coupling part, respectively, and the fitting indication portions of the intermediate part are recesses or protrusions on the intermediate part which are adapted to be fitted on the protrusions or the recesses of the first coupling part and of the second coupling part, respectively.

According to a fourth aspect, in the Oldham coupling according to any one of the first to third aspects, the fitting indication portions of the first coupling part, of the second coupling part and of the intermediate part are magnetic portions for providing a magnetic action between the first coupling part and the intermediate part and between the second coupling part and the intermediate part.

According to a fifth aspect, in the Oldham coupling according to any one of the first to fourth aspects, the fitting indication portions of the first coupling part, of the second coupling part and of the intermediate part are recesses on the first coupling part, on the second coupling part and on the intermediate part, respectively, and a connecting member is provided between the recesses of the first coupling part and of the intermediate part and between the recesses of the second coupling part and of the intermediate part, respectively.

According to a sixth aspect, a manufacturing process for manufacturing an Oldham coupling is provided. The manufacturing process includes preparing a first coupling part adapted to be fixed on a rotational shaft of an electric motor, preparing a second coupling part adapted to be fixed on a rotational shaft of a detector for detecting information on rotational movement of the electric motor, preparing an intermediate part adapted to be provided between the first coupling part and the second coupling part, the intermediate part including a pair of fitting portions extending perpendicular to each other, the fitting portion on one end surface of the intermediate part being adapted to be fitted on the first coupling part, the fitting portion on the other end surface of the intermediate part being adapted to be fitted on the second coupling part, the first coupling part, the second coupling part, and the intermediate part of the Oldham coupling having a fitting indication portion for determining a positional relationship between the first coupling part and the second coupling part about a rotational axis, respectively, and fitting the first coupling part and the second coupling part on the intermediate part, based on the fitting indication portions.

According to a seventh aspect, a coupling process for coupling a rotational shaft of an electric motor and a rotational shaft of a detector to each other by the Oldham coupling according to the first aspect, wherein the fitting indication portions of the first coupling part, of the second coupling part and of the intermediate part are visually recognizable marks, respectively, the process including positioning the first coupling part, the second coupling part, and the intermediate part in relation to one another such that the fitting indication portion of the intermediate part is situated between the fitting indication portions of the first coupling part and of the second coupling part.

According to an eighth aspect, an electric motor including the Oldham coupling according to any one of the first to fifth aspect is provided.

These and other objects, features and advantages of the present invention will become more apparent in light of the detailed description of exemplary embodiments thereof as illustrated by the drawings.

DETAILED DESCRIPTION

Embodiments of the present invention will be described below with reference to the accompanying figures. Constituent elements of the illustrated embodiments may be modified in size in relation to one another for better understanding of the present invention.

Figure 1:
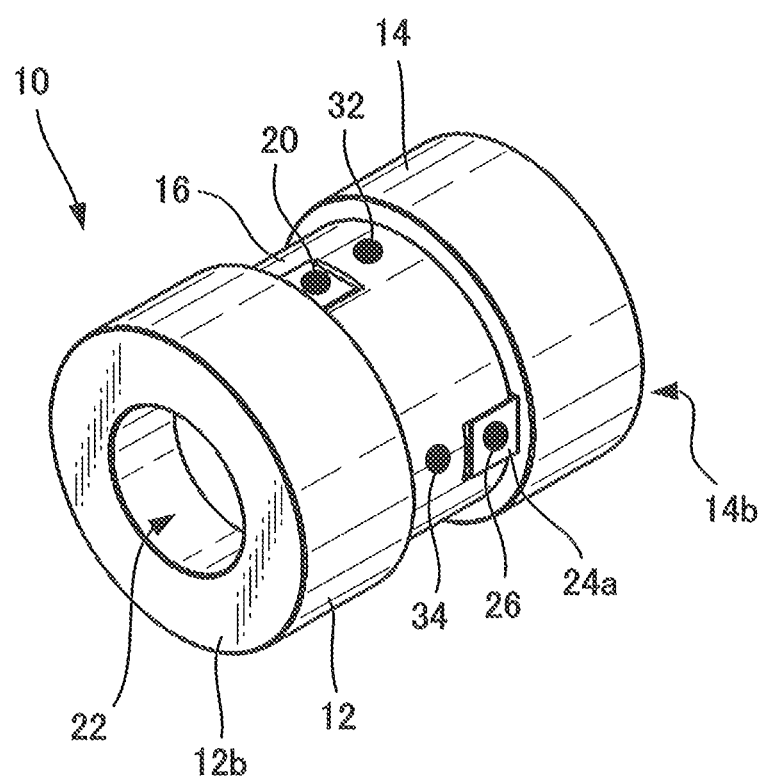
FIG. 1 is a perspective view illustrating an Oldham coupling according to one embodiment of the present invention.
Figure 2:
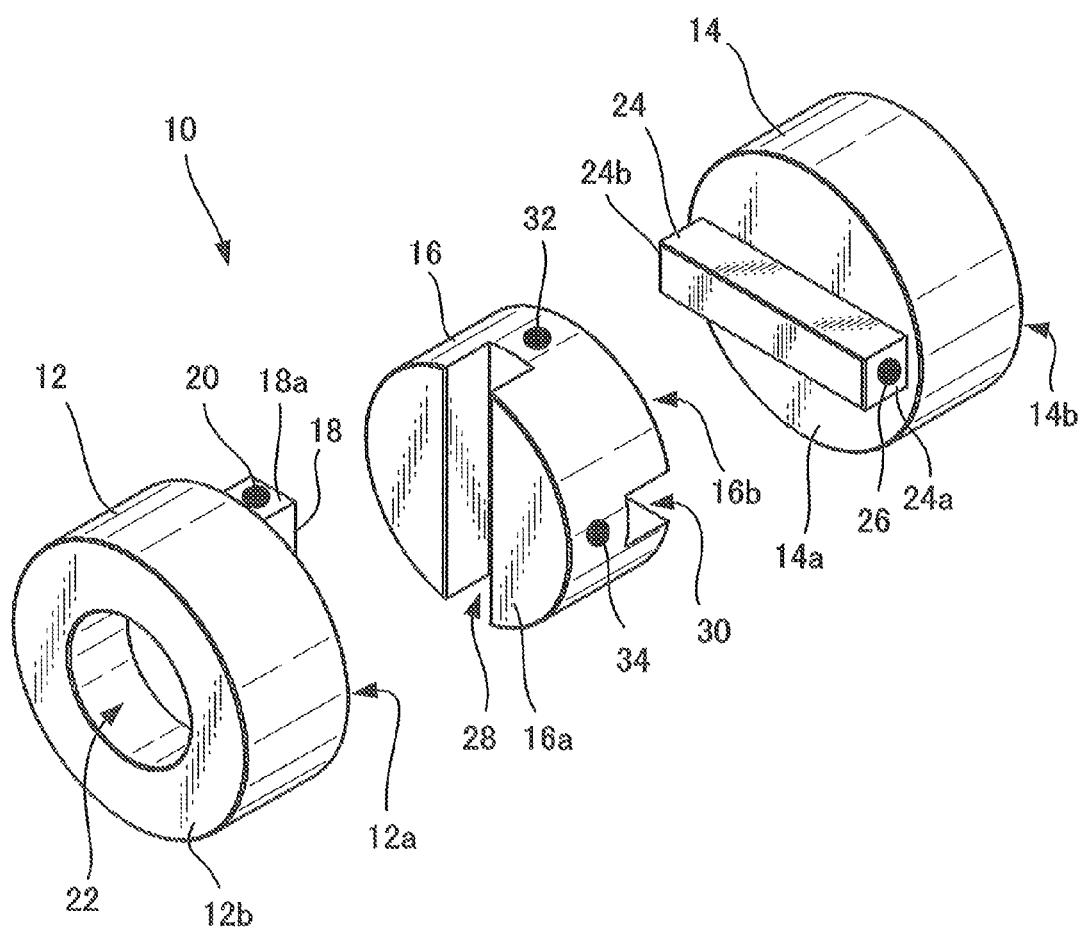
FIG. 2 is an exploded perspective view illustrating the Oldham coupling shown in FIG. 1.

FIG. 1 is a perspective view illustrating an Oldham coupling 10 according to an embodiment of the present invention. FIG. 2 is an exploded perspective view illustrating the Oldham coupling 10 shown in FIG. 1. The Oldham coupling 10 includes a first coupling part 12 fixed to a rotational shaft of a synchronous electric motor (not shown), a second coupling part 14 fixed to a rotational shaft of a detector (not shown), and an intermediate part 16 provided between the first coupling part 12 and the second coupling part 14. The detector may be a rotary encoder for detecting information on rotational movement of the electric motor, e.g., at least one of rotational angular positions, rotational speeds, rotational accelerations.

In the present embodiment, the first coupling part 12 substantially has a cylindrical shape. The first coupling part 12 has an elongated protruding piece 18 on an end surface 12a facing the intermediate part 16 and the protruding piece 18 protrudes from the end surface 12a toward the intermediate part 16. The protruding piece 18 substantially extends diametrically through the center of the first coupling part 12. The protruding piece 18 has a mark 20 on an end surface 18a and the mark 20 serves as a fitting indication portion, which will be further described below. The first coupling part 12 has a recess 22 of a circular shape on an end surface 12b on the other side of the end surface 12a. The recess 22 is substantially concentric with the first coupling part 12 and has a diameter smaller than a diameter of the first coupling part 12 so that sufficient mechanical strength is not impaired. The recess 22 is adapted to directly or indirectly receive a rotational shaft of the electric motor, which is not shown. Accordingly, the specific shape of the recess 22 depends on the shape of the rotational shaft of the electric motor.

The second coupling part 14 substantially has a cylindrical shape, similarly to the first coupling part 12. The second coupling part 14 has an elongated protruding piece 24 on an end surface 14a facing the intermediate part 16 and the protruding piece 24 protrudes from the end surface 14a toward the intermediate part 16. The protruding piece 24 substantially extends diametrically through the center of the second coupling part 14. The protruding piece 24 has a mark 26 on an end surface 24a and the mark 26 serves as a fitting indication portion, which will be further described below. The second coupling part 14 has a recess of a circular shape, which is not shown, on an end surface 14b on the opposite side of the end surface 14a. The recess is substantially concentric with the second coupling part 14 and has a diameter smaller than a diameter of the second coupling part 14 so that sufficient mechanical strength is not impaired. The recess is adapted to directly or indirectly receive a rotational shaft of a detector, which is not shown. Accordingly, the specific shape of the recess depends on the shape of the rotational shaft of the detector. The second coupling part 14 may have a similar shape to that of the first coupling part 12, but they may also have a different shape from each other.

According to the present embodiment, the intermediate part 16 of a cylindrical shape has an elongated groove 28 on an end surface 16a. The intermediate part 16 also has an elongated groove 30 on the other end surface 16b. The grooves 28 and 30 extend diametrically through the center of the intermediate part 16, respectively, and perpendicular to each other. The intermediate part 16 has marks 32 and 34 on an outer circumferential surface and near ends of the grooves 28 and 30, respectively. The marks 32 and 34 serve as a fitting indication portion, respectively, as further described below.

The groove 28 on the end surface 16a facing the first coupling part 12 serves as a fitting portion adapted to be slidably fitted on the protruding piece 18 of the first coupling part 12. The groove 30 on the end surface 16b facing the second coupling part 14 serves as a fitting portion adapted to be slidably fitted on the protruding piece 24 of the second coupling part 14. The grooves 28 and 30 have a width in a direction perpendicular to a longitudinal direction so that the protruding pieces 18 and 24 are slidable on the grooves 28 and 30. Fitting therebetween may be a clearance fit, a transition fit, or an interference fit, but a transition fit or an interference fit in which there is no backlash is preferred. In order to achieve fitting without backlash and with lower friction at the same time, the first and second coupling parts 12 and 14 or the intermediate part 16 can be made of a resilient material such as plastic. When the electric motor and the detector are coupled to each other by the Oldham coupling, it is less likely that large torque or force will be exerted, and therefore, there will be no problem with plastic and the like when it comes to structural strength. When plastic is used for this purpose, the marks 20, 26, 32 and 34 may be advantageously integrally formed. With such a configuration, even in the case where the rotational shaft of the electric motor is eccentric in relation to the rotational shaft of the detector, the amount of eccentricity can be compensated by relative movement of the intermediate part 16.

As can be clearly seen in FIG. 1, when the first coupling part 12 is coupled to the intermediate part 16, the mark 20 on the protruding piece 18 of the first coupling part 12 and the mark 32 on the outer circumferential surface of the intermediate part 16 in the vicinity of the groove 28 are situated adjacent to each other. Similarly, when the second coupling part 14 is coupled to the intermediate part 16, the mark 26 on the protruding piece 24 of the second coupling part 14 and the mark 34 on the outer circumferential surface of the intermediate part in the vicinity of the groove 30 are situated adjacent to each other. When the Oldham coupling 10 is assembled so that the marks 20, 26, 32 and 34 are situated in relation to one another in accordance with the above positional relationship, it can be understood that the positional relationship between the first coupling part 12 and the second coupling part 14 about the rotational axis is appropriate.

Figure 3:
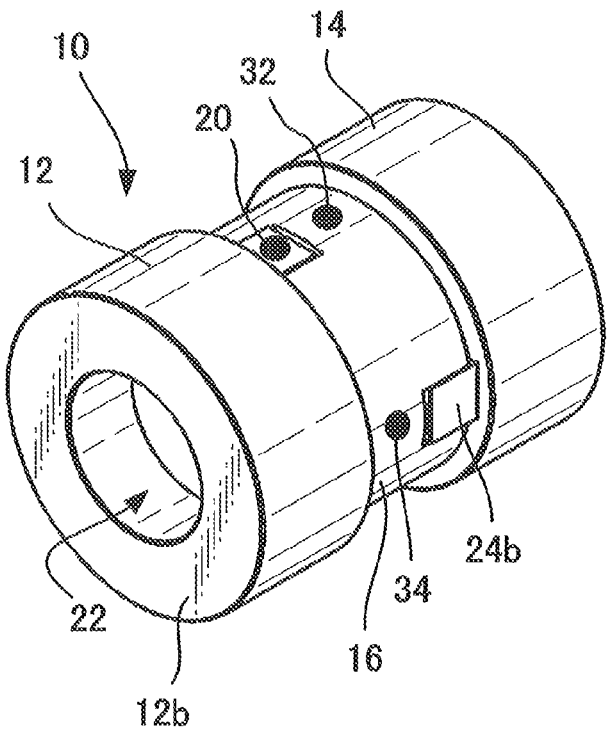
FIG. 3 is a view to explain a function of fitting indication portions according to one embodiment of the present invention.

FIG. 3 is a view to explain a function of the fitting indication portions according to the embodiment of the present invention. FIG. 3 shows the state where the second coupling part 14 is coupled to the intermediate part 16 with the second coupling part 14 rotated by 180 degrees from the position shown in FIG. 1. As compared with FIG. 1, instead of the mark 26, the end surface 24b on the opposite side of the mark 26 can be seen. Accordingly, with the Oldham coupling 10 in the present embodiment, it can be easily recognized when the first coupling part 12 and the second coupling part 14 are coupled to each other in a positional relationship with the intermediate part 16 different from an appropriate relationship. It can also be easily recognized even after the first coupling part 12 or the second coupling part 14 is erroneously coupled to the intermediate part 16 by being rotated by 180 degrees from an expected orientation. Thus, this configuration allows a positional relationship between the first coupling part 12 and the second coupling part 14 about the rotational axis to be determined.

Figure 4:
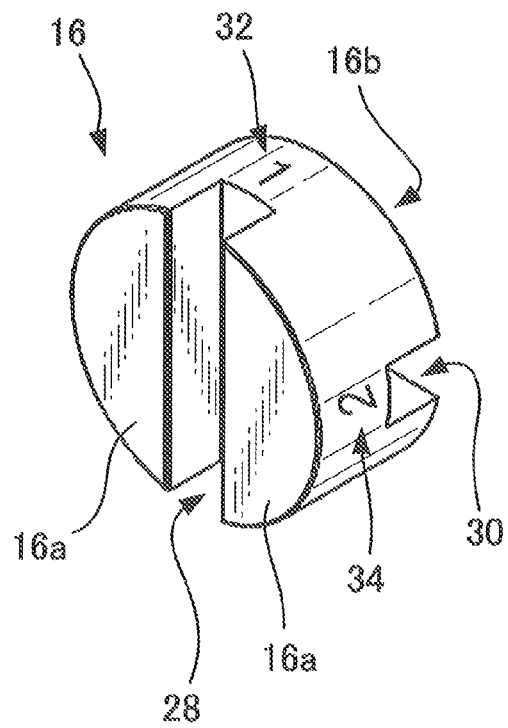
FIG. 4 is a view to explain an intermediate part according to one embodiment of the present invention.
Figure 5:
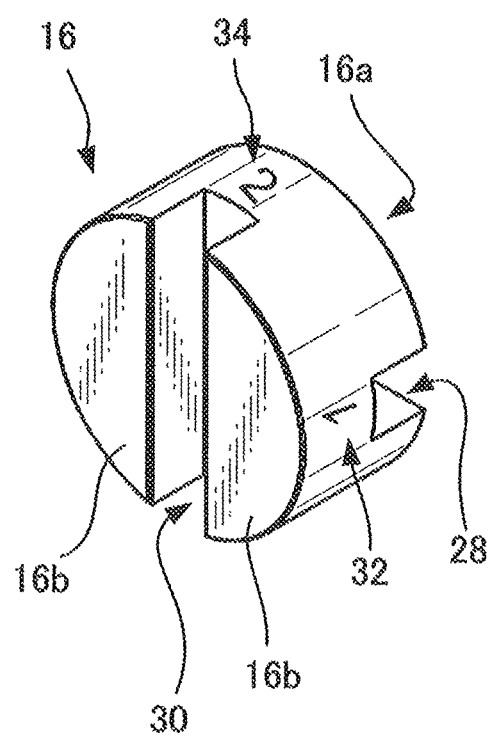
FIG. 5 is a view to explain an intermediate part according to one embodiment of the present invention.

The case where the intermediate part 16 is turned over about the rotational axis from the state shown in FIGS. 1 and 2 so that the end surface 16a of the intermediate part 16 faces the second coupling part 14 and the end surface 16b faces the first coupling part 12 will now be described. Even in such a case, the fitting indication portions of the Oldham coupling 10 in the present embodiment still maintain their functions. FIGS. 4 and 5 are views to explain the intermediate part 16 according to the embodiment of the present invention. In FIGS. 4 and 5, numbers "1" and "2" are conceptually depicted on the intermediate part 16. The numbers "1" and "2" correspond to the above-described marks 32 and 34, respectively, but the numbers are used here instead of the black dots for explanation. As can be seen from FIGS. 4 and 5, the positional relationship between the marks 32 and 34 remains the same even when the intermediate part 16 is turned over. Thus, the intermediate part 16 according to the present embodiment allows the marks 32 and 34 to serve as the fitting indication portions even if the orientation of the intermediate part 16 relative to the coupling parts 12 and 14 is changed. Accordingly, the intermediate part 16 can be used irrespective of its orientation in use, as long as the grooves 28 and 30 substantially have the same size such as the depth and the width.

In the present embodiment, the marks 20, 26, 32 and 34 as the fitting indication portions may be formed by any way, as long as they are recognizable by a human eye, an image sensor or any other detecting means. For example, they may be any distinguishable letters or figures formed by slightly cutting a surface of those parts or by printing thereon.

Figure 21:
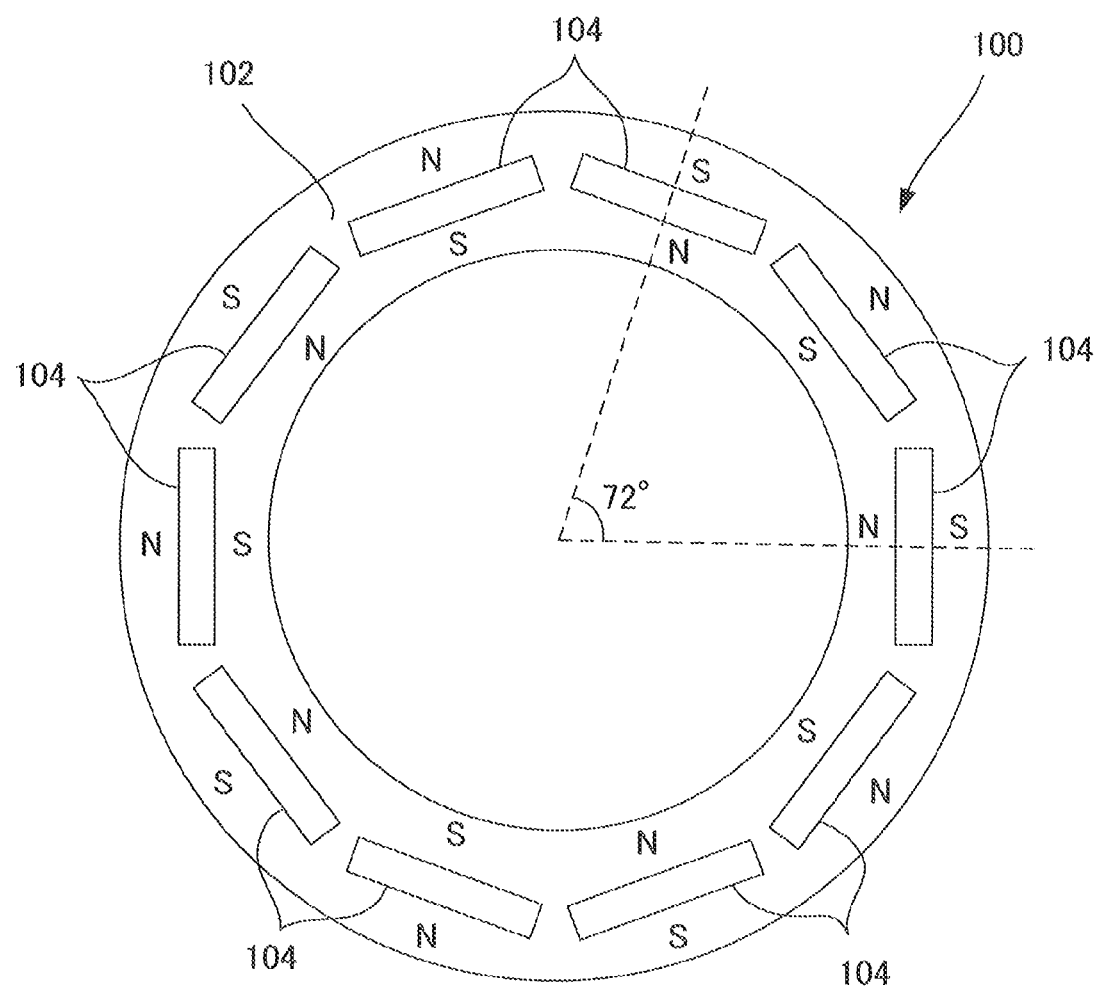
FIG. 21 is a conceptual view illustrating an exemplary configuration of a rotor for a synchronous electric motor.
Figure 22:
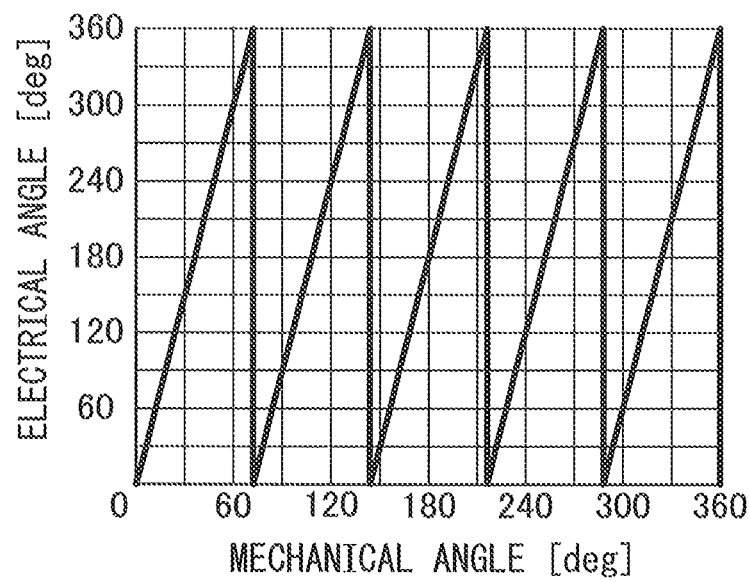
FIG. 22 is a graph showing a relationship between mechanical angles and electrical angles in a rotor having five pairs of magnetic poles.

The present invention is particularly effective for a synchronous electric motor having an odd number of pairs of magnetic poles. Referring to FIGS. 21 and 22, an exemplary synchronous electric motor having five pairs of magnetic poles will be described. FIG. 21 is a conceptual view illustrating a configuration of a rotor 100 for an exemplary synchronous electric motor. FIG. 22 is a graph showing a relationship between mechanical angles and electrical angles in a rotor having five pairs of magnetic poles.

The rotor 100 for a synchronous electric motor includes a rotor body 102 which is a cylindrical iron core formed by a stacked steel plates, and ten permanent magnets 104 arranged at certain intervals in a circumferential direction of the rotor body 102. The permanent magnets 104 are magnetized so as to have a repeated pattern in which S poles and N poles alternate with each other in the circumferential direction. Letters "N" and "S" depicted near the permanent magnets 104 conceptually represent magnetized directions, respectively. The rotor 100 generates rotational power in cooperation with a stator (not shown) including windings.

Each pair of magnetic poles is associated with one cycle of sinusoidal electric current supplied to the windings of the stator, i.e., electric angels of 0 to 360 degrees. Therefore, as shown in FIG. 22, a cycle of electric angles of 0 to 360 degrees is repeated for every physical angel or a mechanical angle of 72 degrees corresponding to each pair of magnetic poles. If a reference position of the rotational shaft of the electric motor matches a reference position of the rotational shaft of the detector, rotational movement of the electric motor can be precisely controlled, even in the case where the electric angles and the mechanical angles are in a relationship as shown in FIG. 22. For example, when the rotational shafts of the electric motor and of the detector are at 0 degree in their referential positions, respectively, there will be no discrepancy between a detected value of the detector and an actual rotational angular position of the electric motor. Therefore, in this case, an electric current can be controlled based on the detected information.

On the other hand, the Oldham coupling can also be assembled in a state where either one of the two coupling parts is rotated by 180 degrees in relation to the other. In such a case, an angle detected by the detector is shifted by 180 degrees from an actual rotational angular position. As can be seen in FIG. 22, for example, an electrical angle corresponding to a mechanical angle of 0 degree does not match an electrical angle corresponding to a mechanical angle of 180 degrees. When an electric current is supplied to the windings based on detected values which are at phases shifted by 180 degrees, the electric motor cannot be controlled as intended. This problem is not associated only with a synchronous electric motor having five pairs of magnetic poles as illustrated, but also arises in other synchronous electric motors having an odd number of pairs of magnetic poles.

Figure 23:
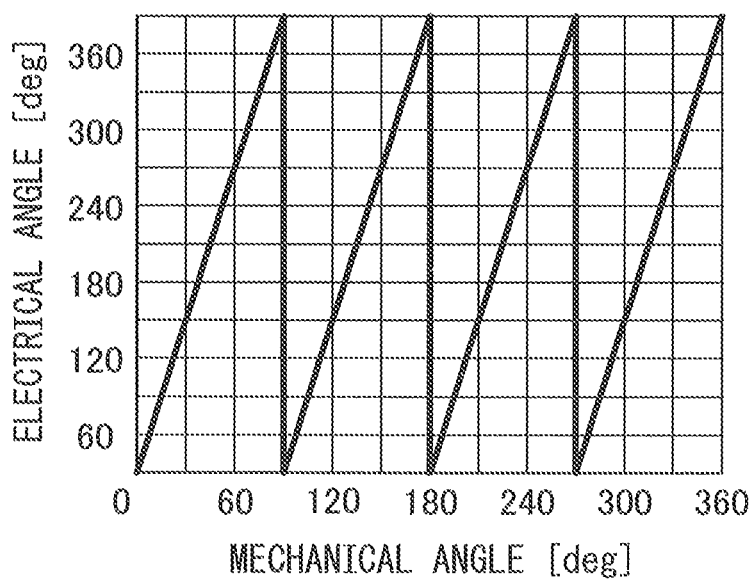
FIG. 23 is a graph showing a relationship between mechanical angles and electrical angles in a rotor having four pairs of magnetic poles.

FIG. 23 is a graph showing a relationship between mechanical angles and electrical angles in a rotor having four pairs of magnetic poles. In this case, it can be seen that a cycle of electric angles of 0 to 360 degrees is repeated for every mechanical angle of 90 degrees. Thus, unlike the above example with the five pairs of magnetic poles, an electric current at an appropriate phase can be provided to the windings in this case, even if detected mechanical angles are shifted by 180 degrees. Consequently, the above problem in relation to the Oldham coupling can be prevented with a synchronous electric motor having an even number of pairs of magnetic poles.

According to the present invention, the fitting indication portions clearly indicate the positional relationship between the first coupling part, the second coupling part and the intermediate part about the rotational axis, when the first coupling part and the second coupling part are coupled together with the intermediate part. Therefore, the coupling parts can be prevented from being coupled with them unintentionally rotated by 180 degrees relative to each other. This can obviate the conventional problems that a control current may be supplied at an inappropriate phase and allow the Oldham coupling to be used for a synchronous electric motor, irrespective of the number of pair of magnetic poles. As a result, the Oldham coupling can be adapted to various applications.

Next, other embodiments of the present invention different from the above one will be described. In the following description, matters that have already been described will be omitted to avoid redundancies, and like elements are designated with the same reference numerals.

Figure 6:
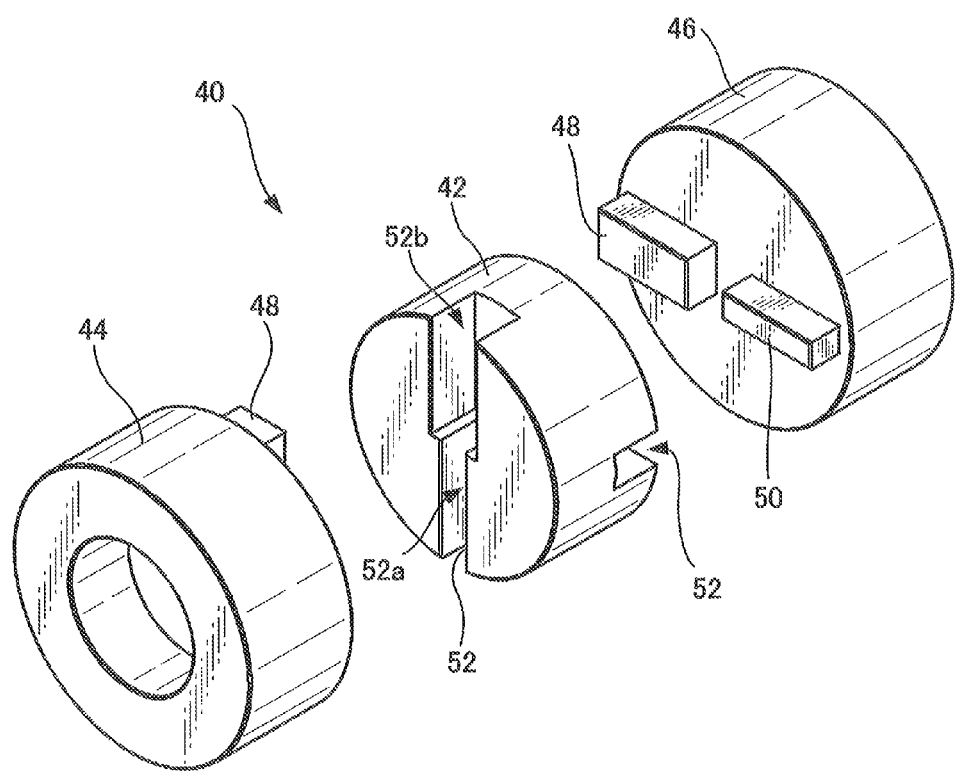
FIG. 6 is an exploded perspective view illustrating an Oldham coupling according to another embodiment of the present invention.
Figure 7:
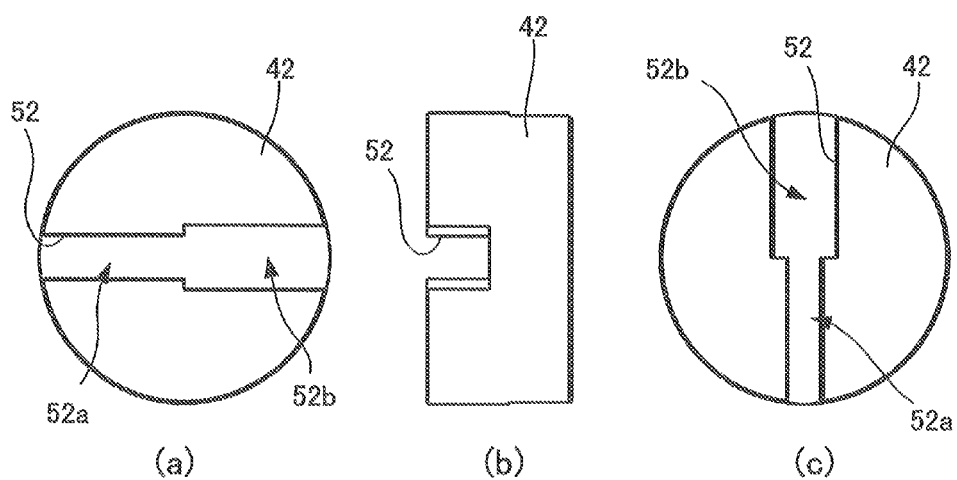
FIG. 7 is a plan view, a side view and a bottom view illustrating an intermediate part of the Oldham coupling shown in FIG. 6.
Figure 8:
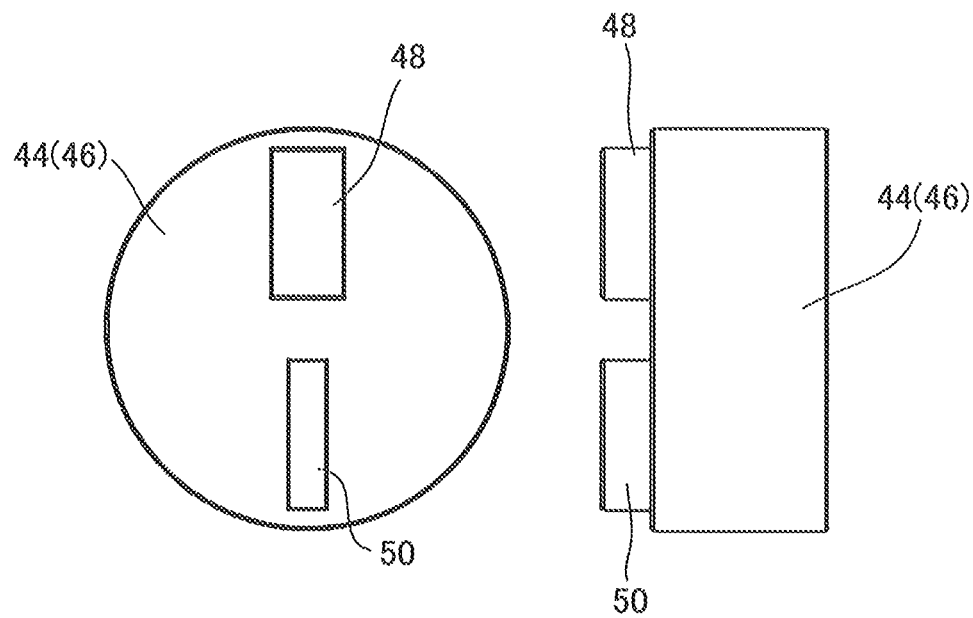
FIG. 8 is a plan view and a side view illustrating a coupling part of the Oldham coupling shown in FIG. 6.

FIG. 6 is an exploded perspective view illustrating an Oldham coupling 40 according to another embodiment of the present invention. FIG. 7 shows a plan view (a), a side view (b) and a bottom view (c) illustrating an intermediate part 42 in the Oldham coupling 40 shown in FIG. 6. FIG. 8 shows a plan view (a) and a side view (b) illustrating coupling parts 44 and 46 of the Oldham coupling 40 shown in FIG. 6. In this embodiment, since the coupling parts 44 and 46 have the same shape, they are commonly illustrated in FIG. 8, rather than separately.

In the present embodiment, an elongated groove 52 on the intermediate part 42 has a stepped width defined by a narrower portion 52a and a wider portion 52b. The boundary between the narrower portion 52a and the wider portion 52b is substantially near the center of the intermediate part 42. Thus, in the present embodiment, the groove 52 is formed so that its width is enlarged near the center of the intermediate part 42. The coupling parts 44 and 46 each have a pair of elongated protruding pieces 48 and 50 protruding from an end surface facing the intermediate part 42. The protruding piece 48 has a width larger than a width of the protruding piece 50 in a direction perpendicular to a longitudinal direction. The width of the protruding piece 48 is sized so that the protruding piece 48 cannot be fitted on the narrower portion 52a of the groove 52 even when elastically deformed, while it can slide on the wider portion 52b. Fitting therebetween may be a clearance fit, a transition fit or an interference fit, but a transition fit or an interference fit in which there is no backlash is preferred. In order to achieve fitting without backlash and with lower friction at the same time, the first and second coupling parts 44 and 46 or the intermediate part 42 can be made of a resilient material such as plastic. The protruding piece 50 is sized so that it can slide on the narrower portion 52a of the groove 52. Fitting therebetween may be a clearance fit, a transition fit or an interference fit, but a transition fit or an interference fit in which there is no backlash is preferred. In order to achieve fitting without backlash and with lower friction at the same time, the first and second coupling parts 44 and 46 or the intermediate part 42 can be made of a resilient material such as plastic. In the present embodiment, fitting between the first coupling part 44 and the intermediate part 42 and fitting between the second coupling part 46 and the intermediate part 42 is achieved by a combination of the pair of protruding pieces 48 and 50 of the coupling parts 44 and 46 and the groove 52 of the intermediate part 42.

In the present embodiment, the protruding pieces 48 of the coupling parts 44 and 46 cannot be fitted on the narrower portion 52a, but can be fitted on the wider portion 52b because of their sizes. Thus, the first coupling part 44 and the second coupling part 46 can be fitted on the intermediate part 42 only when they are in a certain positional relationship. With such a configuration, similar to the above embodiment, the positional relationship between the first coupling part 44 and the second coupling part 46 about the rotational axis can be determined. As a result, it is ensured that a referential position of the electric motor correspond to a referential position of the detector.

As described above with reference to FIGS. 6 to 8, the fitting indication portions of the first coupling part 44 and the second coupling part 46 are defined by the shapes of the protruding pieces 48 and 50 which are adapted to be fitted on the groove 52 of the intermediate part 42. In this case, the fitting indication portions of the intermediate part are formed by the shapes of the grooves 42 which are adapted to be fitted on the first coupling part 44 and the second coupling part 46.

Figure 9:
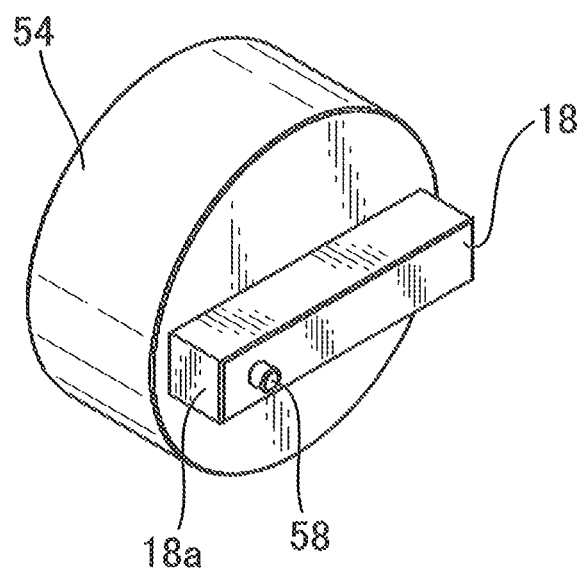
FIG. 9 is a perspective view illustrating a coupling part according to another embodiment of the present invention.
Figure 10:
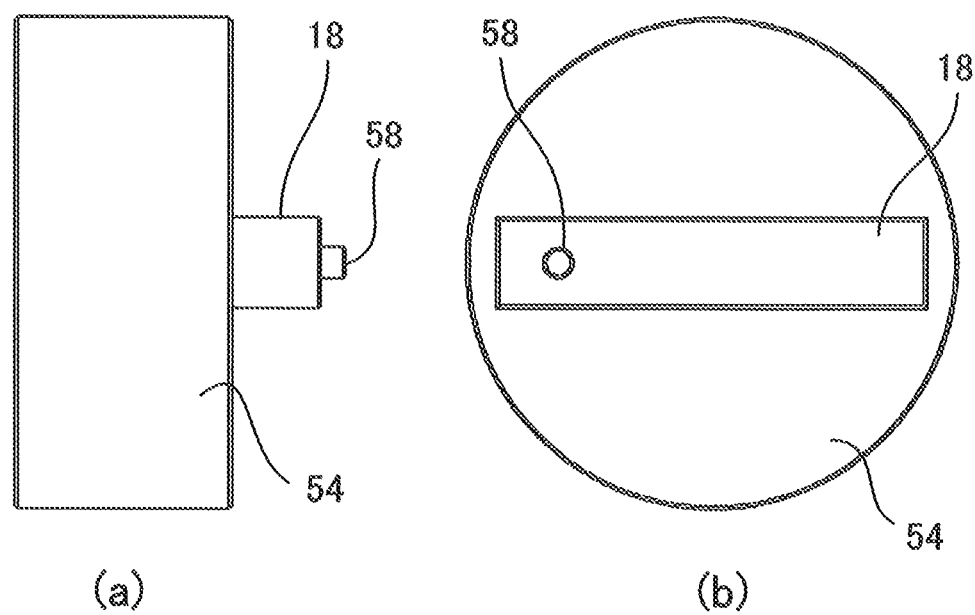
FIG. 10 is a side view and a plan view illustrating the coupling part shown in FIG. 9.
Figure 11:
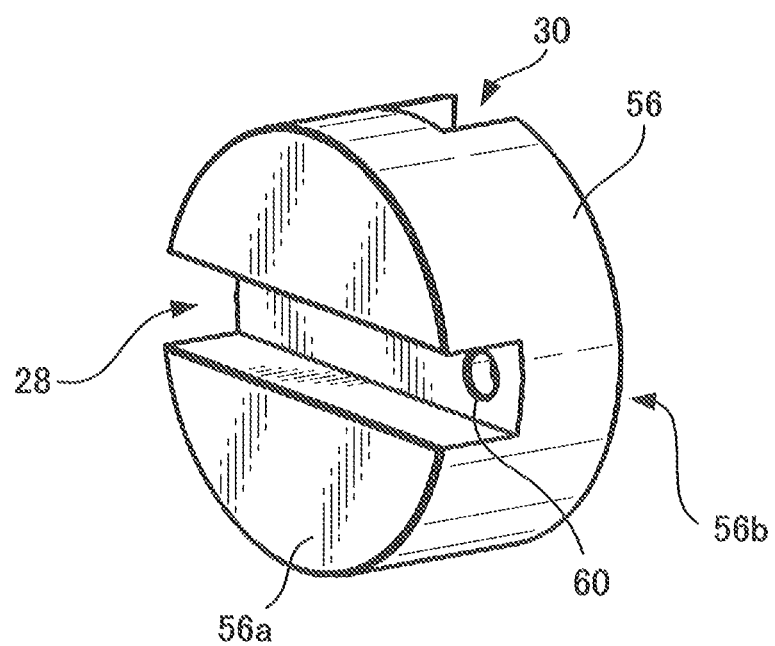
FIG. 11 is a perspective view illustrating an intermediate part used together with the coupling part shown in FIGS. 9 and 10.
Figure 12:
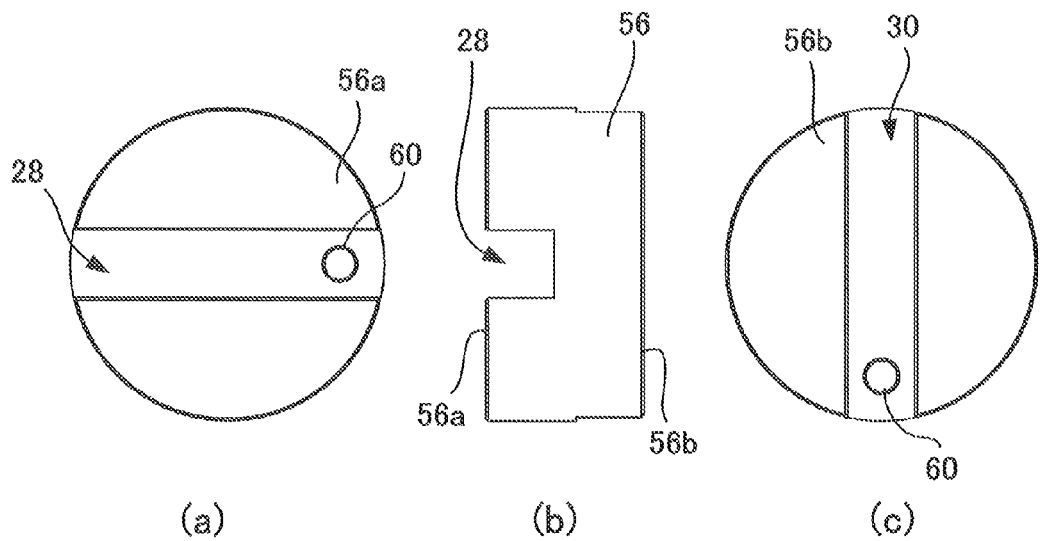
FIG. 12 is a plan view, a side view and a bottom view illustrating the intermediate part shown in FIG. 11.

Referring to FIGS. 9 to 12, an Oldham coupling according to another embodiment of the present invention will be described. FIG. 9 is a perspective view illustrating a coupling part 54 according to the embodiment. FIG. 10 shows a side view (a) and a plan view (b) illustrating the coupling part 54 shown in FIG. 9. FIG. 11 is a perspective view illustrating an intermediate part 56 used together with the coupling part 54 shown in FIGS. 9 and 10. FIG. 12 shows a plan view (a), a side view (b) and a bottom view (c) illustrating the intermediate part 56 shown in FIG. 11. Since a pair of coupling parts 54 of the Oldham coupling have the same shape, only one of the coupling parts 54 is illustrated and will be described below.

The coupling part 54 has a similar shape to that of the first coupling part 12 or the second coupling part 14 described above with reference to FIGS. 1 and 2. However, a protruding piece 18 of the coupling part 54 in the present embodiment has a protrusion 58 of a substantially cylindrical shape protruding from a surface of the protruding piece 18, as shown in FIGS. 9 and 10. The protrusion 58 is located distant from the center of the coupling part 54 and near the end surfaces 18a of the protruding piece 18. On the other hand, the intermediate part 56 is provided with recesses 60 on the groove 28 on one end surface 56a and on the groove 30 on the other end surfaces 56b, respectively, as shown in FIGS. 11 and 12. The recesses 60 are located distant from the center of the intermediate part 56 and near one ends of the grooves 28 and 30. The recess 60 is located in a position corresponding to the protrusion 58 of the coupling part 54 so as to receive the protrusion 58. A diameter of the recess 60 is larger than a diameter of the protrusion 58 so that the protrusion 58 can move within the recess 60. Thus, in a state where the protrusion 58 is received by the recess 60, the coupling part 54 and the intermediate part 56 are fitted together slidably relative to each other.

In the present embodiment, the protrusion 58 protruding from the protruding piece 18 of the coupling part 54 serves as a fitting indication portion of the coupling part 54, while the recesses 60 on the grooves 28 and 30 of the intermediate part 56 serves as a fitting indication portion. An alternative variant of the present embodiment, which is not shown, may have a configuration in which a recess is formed on the protruding piece 18 of the coupling part 54 and protrusions are formed on the grooves 28 and 30 of the intermediate part 56. With those configurations, the positional relationship between the coupling part 54 and the intermediate part 56 and therefore between the two coupling parts about a rotational axis can be determined, while features as the Oldham coupling are maintained, similarly to the above embodiments.

Figure 13:
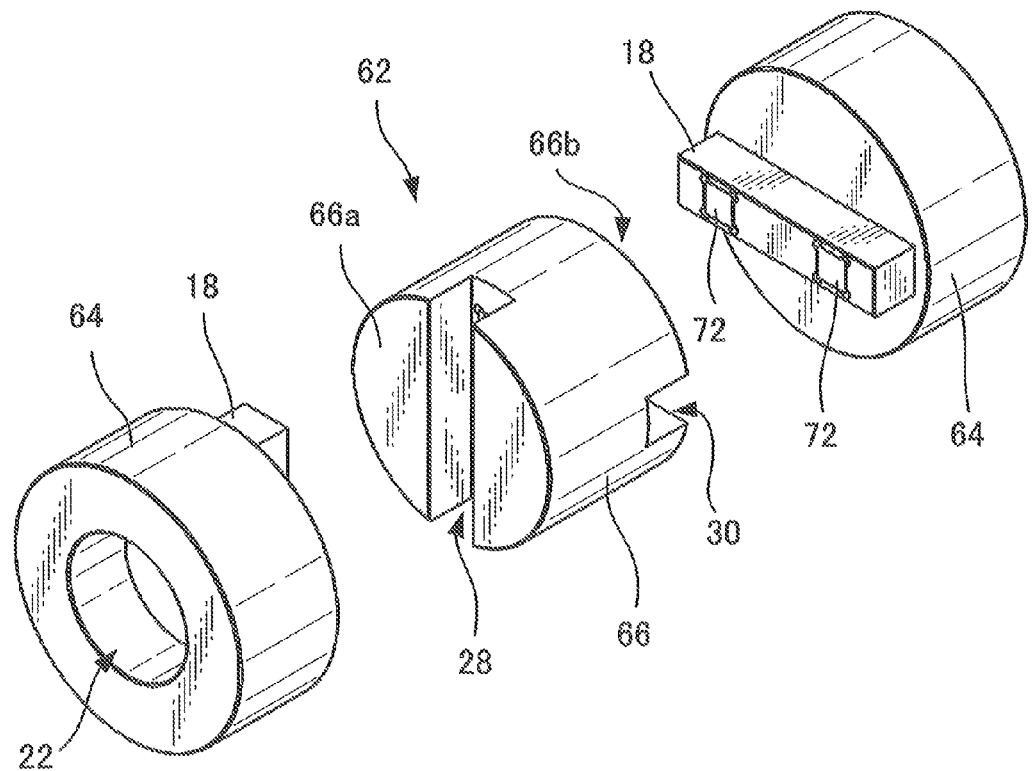
FIG. 13 is an exploded perspective view illustrating an Oldham coupling according to another embodiment of the present invention.
Figure 14:
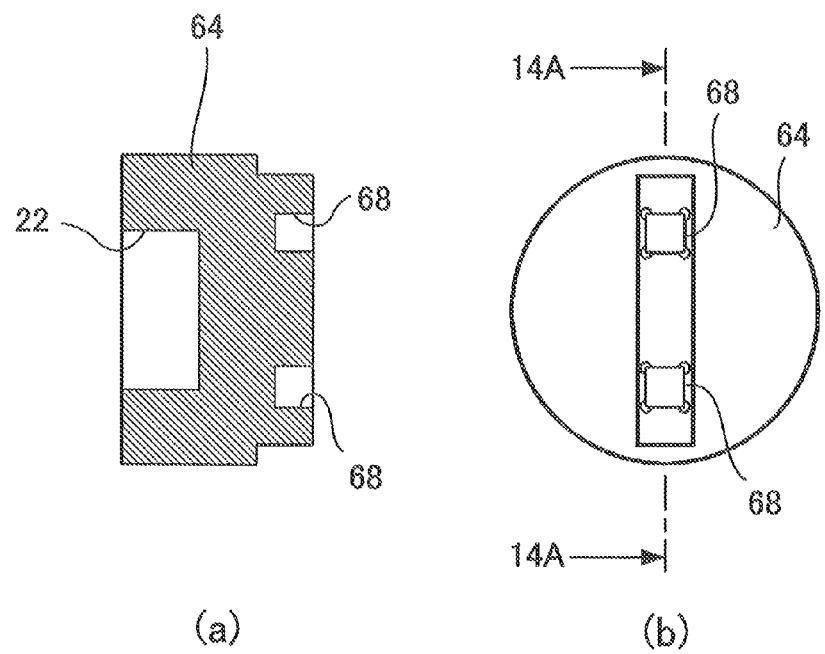
FIG. 14 is a sectional view and a plan view illustrating a coupling part of the Oldham coupling shown in FIG. 13.
Figure 15:
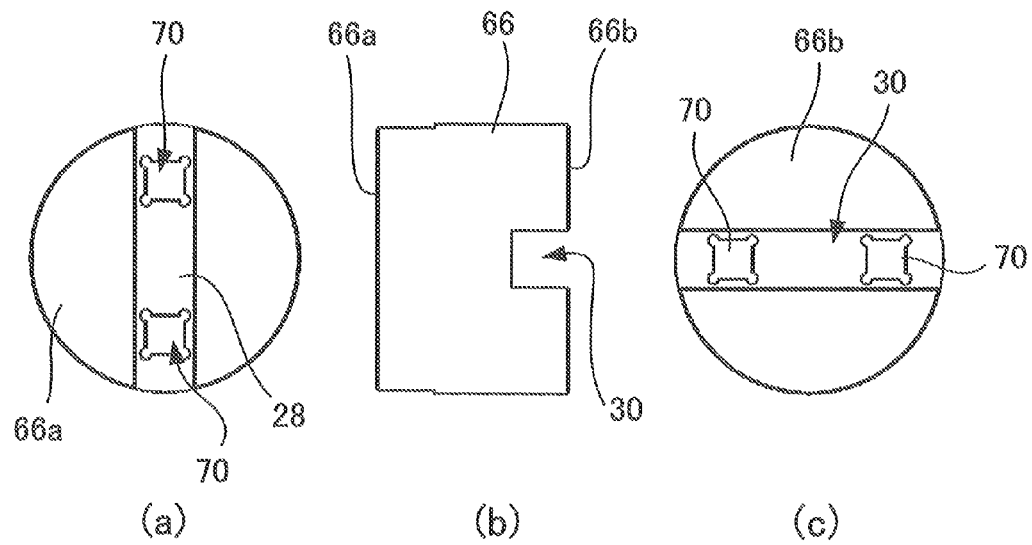
FIG. 15 is a plan view, a side view and a bottom view illustrating an intermediate part of the Oldham coupling shown in FIG. 13.

FIG. 13 is an exploded perspective view illustrating an Oldham coupling 62 according to another embodiment of the present invention. FIG. 14 shows a sectional view (a) and a plan view (b) illustrating a coupling part 64 of the Oldham coupling 62 shown in FIG. 13. FIG. 15 shows a plan view (a), a side view (b) and a bottom view (c) illustrating an intermediate part 66 of the Oldham coupling 62 shown in FIG. 13. In the present embodiment, the coupling part 64 has a similar shape to that of the first coupling part 12 or the second coupling part 14 described above with reference to FIGS. 1 and 2. The intermediate part 66 also has a similar shape to that of the intermediate part 16 described above with reference to FIGS. 1 and 2.

In the present embodiment, the coupling part 64 is provided with a pair of recesses 68 of a rectangular shape on a surface of the protruding piece 18. The intermediate part 66 is also provided with similar recesses 70 on the grooves 28 and 30, respectively. These recesses 68 and 70 are provided oppositely distant from the center of the coupling part 64 and the intermediate part 66, respectively. As shown in FIG. 13, permanent magnets 72 are fixed on the recesses 68 and 70 by an adhesive, for example. The recesses 68 and 70 are sized so that they are slightly larger than the outer shape of the permanent magnets 72. The recesses 68 and 70 have circular holes at the four corners, and an adhesive is applied to those holes as well. Each hole is formed as a result of use of a tool such as an end mill. Before the permanent magnets 72 are placed in the recesses 68 and 70, an adhesive is applied to the circumferential walls and the holes at the corners of the recesses 68 and 70. It is thus ensured that the permanent magnets 72 are settled in the recesses 68 and 70.

In the Oldham coupling 62 according to the present embodiment, two permanent magnets 72 are installed to the coupling part 64 and two permanent magnets 72 are installed to the intermediate part 66 on each of the end surfaces 66a and 66b, and therefore four permanent magnets 72 are installed to the intermediate part 66. The two permanent magnets 72 of each coupling part 64 are magnetized so as to have magnetic poles in opposite directions on the surface facing the intermediate part 66. In other words, one of the permanent magnets 72 of each coupling part 64 forms an N pole and the other forms an S pole toward the intermediate part 66. Similarly, the permanent magnets 72 of the intermediate part 66 on the end surface are magnetized in opposite directions to each other. With such a configuration, a magnetic interaction occurs between the permanent magnet 72 of the coupling part 64 and the permanent magnet 72 of the intermediate part 66. Due to the magnetic interaction, either repulsive force or attractive force acts between the permanent magnets 72, depending on the positional relationship between the coupling part 64 and the intermediate part 66. The magnetized directions are set so that attractive force is generated by the permanent magnets 72 when the positional relationship between the coupling part 64 and the intermediate part 66 is appropriate. In this way, the Oldham coupling 62 according to the present embodiments makes it possible to determine the positional relationship between each coupling part 64 and the intermediate part 66 and therefore between the coupling parts 64. Particulars such as an arrangement and the number of the permanent magnets 72 are not limited to the illustrated embodiment.

Figure 16:
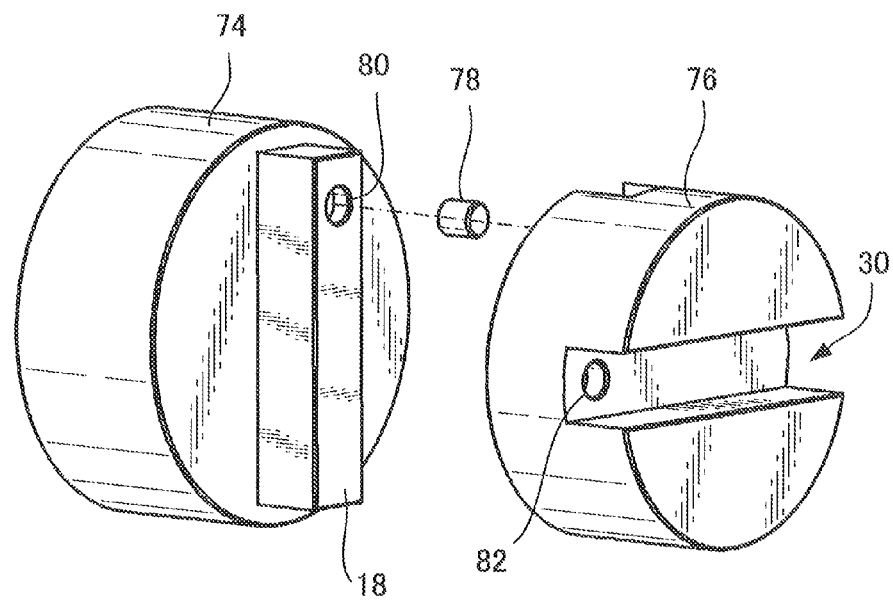
FIG. 16 is an exploded perspective view illustrating a coupling part, an intermediate part and a connecting part of an Oldham coupling according to another embodiment of the present invention.
Figure 17:
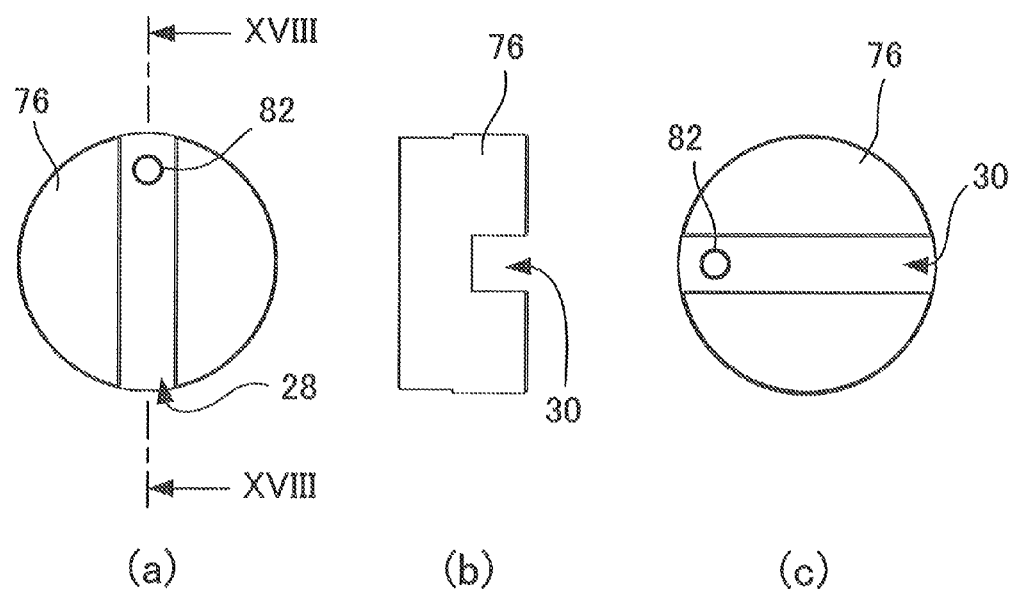
FIG. 17 is a plan view, a side view and a bottom view illustrating the intermediate part shown in FIG. 16.
Figure 18:
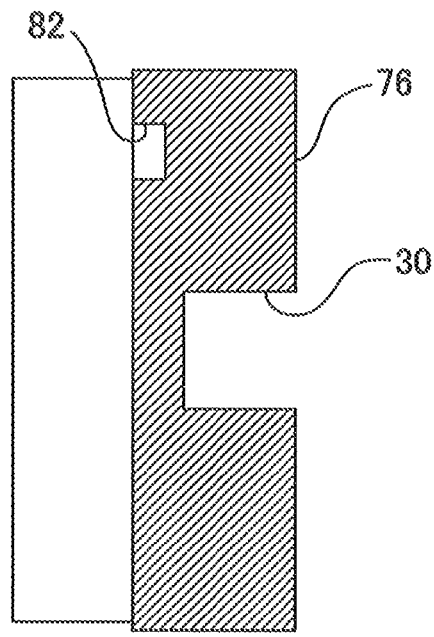
FIG. 18 is a sectional view taken along line XVIII-XVIII in part (a) of FIG. 17.

FIG. 16 is an exploded perspective view illustrating a coupling part 74, an intermediate part 76 and a connecting part 78 of an Oldham coupling according to another embodiment of the present invention. FIG. 17 is a plan view (a), a side view (b) and a bottom view (c) illustrating the intermediate part 76 shown in FIG. 16. FIG. 18 is a sectional view taken along line XVIII-XVIII in part (a) of FIG. 17. In FIG. 16, only one of a pair of coupling parts 74 of the Oldham coupling is shown. The other coupling part may have the same shape as the illustrated coupling part 74. The coupling part 74 and the intermediate part 76 have shapes similar to those of the coupling part 12 and the intermediate part 16 described above with reference to FIGS. 1 and 2, respectively.

In the present embodiment, the coupling part 74 is provided with a recess 80 of a circular shape on a surface of the protruding piece 18. The recess 80 is located distant from the center of the coupling part 74. Similarly, the intermediate part 76 is provided with a recess 82 of a circular shape on the grooves 28 and 30, respectively. The recess 82 is situated distant from the center of the intermediate part 76. The recess 80 of the coupling part 74 may have the same shape as the recess 82 of the intermediate part 76. In the present embodiment, the connecting part 78 is fitted in the recess 80 of the coupling part 74 and in the recess 82 of the intermediate part 76, as shown in FIG. 16. For example, the connecting part 78 is a cylindrical pin having a certain length so as to extend at least partially both in the recess 80 of the coupling part 74 and in the recess 82 of the intermediate part 76. The connecting part 78 has a size smaller than the recess 80 of the coupling part 74 and the recess 82 of the intermediate part 76, so that the coupling part 74 and the intermediate part 76 can move relative to each other in a state where the connecting part 78 is fitted in the recesses 80 and 82.

In the present embodiment, since the recesses 80 and 82 are located distant from the centers of the coupling part 74 and the intermediate part 76, respectively, the coupling part 74 and the intermediate part 76 cannot be coupled together in a state where either one of the coupling part 74 and the intermediate part 76 is rotated by 180 degrees about a rotational axis. In this embodiment, the recess 80 of the coupling part 74, the recess 82 of the intermediate part 76 and the connecting part 78 cooperate with one another to serve as a fitting indication portion. The fitting indication portion allows the positional relationship between the coupling part 74 and the intermediate part 76 and therefore between the two coupling parts 74 to be determined in a similar way to the above embodiments.

Figure 19:
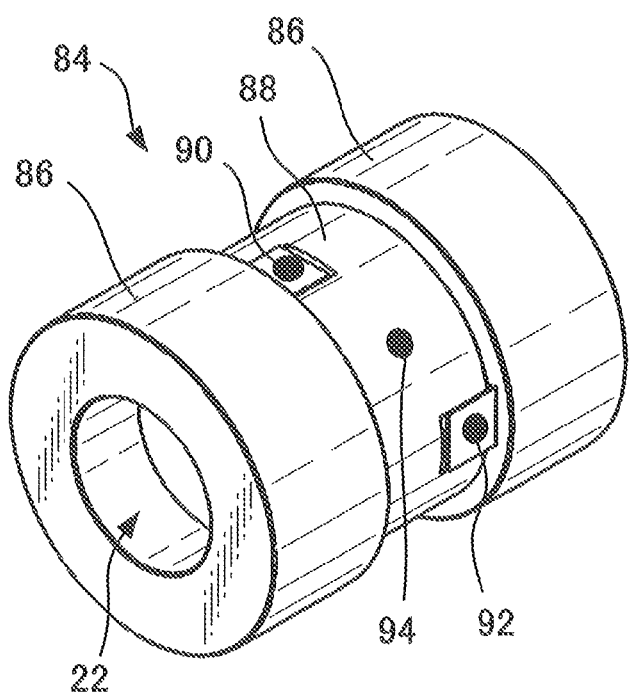
FIG. 19 is a perspective view illustrating an Oldham coupling according to another embodiment of the present invention.
Figure 20:
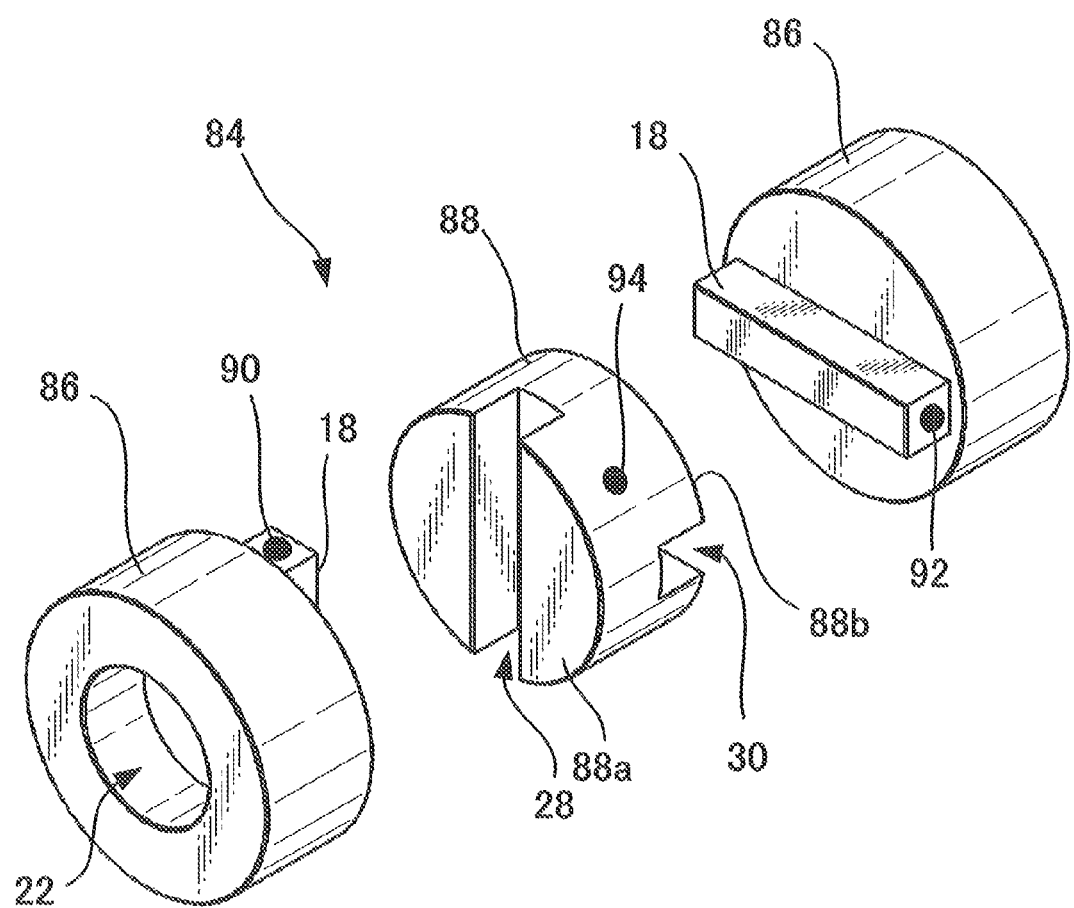
FIG. 20 is an exploded perspective view illustrating the Oldham coupling shown in FIG. 19.

FIG. 19 is a perspective view illustrating an Oldham coupling 84 according to another embodiment of the present invention. FIG. 20 is an exploded perspective view illustrating the Oldham coupling 84 shown in FIG. 19. In the present embodiment, a pair of coupling parts 86 and an intermediate part 88 of the Oldham coupling 84 may substantially have similar shapes to those of the coupling parts 12 and 14 and the intermediate part 16 described above with reference to FIGS. 1 and 2. In particular, the coupling part 86 may have completely the same shape as the coupling parts 12 and 14 in FIGS. 1 and 2.

In the present embodiment, the coupling part 86 and the intermediate part 88 have marks 90, 92 and 94 as fitting indication portions on their outer surfaces visible from the outside, similarly to the embodiment shown in FIGS. 1 and 2. The intermediate part 88 has one mark 94 in the present embodiment, while two marks are provided in the above embodiment. The mark 94 of the intermediate part 88 is provided on the outer circumferential surface of the intermediate part 88 between the grooves 28 and 30 extending perpendicular to each other on the end surfaces 88a and 88b of the intermediate part 88. In the present embodiment, the mark 94 of the intermediate part 88 is positioned between the mark 90 of one of the coupling parts 86 and the mark 92 of the other of the coupling parts 86, as shown in FIG. 19. With such a configuration, if either the coupling part 86 or the intermediate part 88 are coupled to each other in a state where one of them is rotated by 180 degrees and their phases are shifted in relation to each other, it can be recognized immediately by a positional relationship between the marks 90, 92 and 94. Therefore, the positional relationship between the coupling parts 86 can be determined by the fitting indication portion.

In the illustrated embodiments, the Oldham coupling in which the protruding piece (the convex portion) of the coupling parts and the groove (the concave portion) of the intermediate part are fitted on each other has been described by way of example. However, the configuration of the Oldham coupling is not limited to these particular examples. For example, the Oldham coupling may have a configuration in which the coupling parts have grooves and the intermediate part has protruding pieces. Alternatively, the Oldham coupling may have a configuration in which one of the coupling parts has a protruding piece and the other of the coupling parts has a groove. In this case, the intermediate part has a groove on one end surfaces and a protruding piece on the other side.

Although various embodiments of the present invention have been described, it should be obvious to a person skilled in the art that the present invention can also be implemented by any combination of the features of the embodiments explicitly or implicitly disclosed herein.

Effect of the Invention

According to the Oldham coupling of the present invention, when the first coupling part and the second coupling part are coupled to each other with the intermediate part, the positional relationship between the first coupling part and the second coupling part about a rotational axis can be determined by the fitting indication portions. Therefore, the Oldham coupling can be prevented from being assembled in a state where the rotational shaft of the electric motor and the rotational shaft of the detector are shifted by 180 degrees of phases. This allows the Oldham coupling to be used in a synchronous electric motor having an odd number of pairs of magnetic poles and to be improved in its applicability.

According to the manufacturing process of the Oldham coupling of the present invention, the fitting indication portions assist in determining the positional relationship between the first coupling part and the second coupling part. Therefore, an additional step necessary to adjust a reference position of the electric motor and a reference position of the detector will be completely unnecessary. As a result, the Oldham coupling can be provided more efficiently.

According to the coupling process by the Oldham coupling of the present invention, when the electric motor and the detector are coupled to each other, the positional relationship between the first coupling part and the second coupling part around a rotational axis can be determined by the fitting indication portions. Therefore, an additional step necessary to adjust a reference position of the electric motor and a reference position of the detector will be completely unnecessary. As a result, the coupling process of the shafts can be more efficient.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:
1. An Oldham coupling comprising:
    a first coupling part fixed to a rotational shaft of an electric motor;

a second coupling part fixed to a rotational shaft of a detector for detecting information on rotational movement of the electric motor; and an intermediate part provided between the first coupling part and the second coupling part, the intermediate part including a pair of fitting portions extending perpendicular to each other, the fitting portion on one end surface of the intermediate part being fitted on the first coupling part, the fitting portion on the other end surface of the intermediate part being fitted on the second coupling part, wherein the first coupling part, the second coupling part, and the intermediate part have a fitting indication portion for determining a positional relationship between the first coupling part and the second coupling part about a rotational axis, such that a reference position of the rotational shaft of the electric motor and a reference position of the rotational shaft of the detector match each other, thereby allowing information on rotational movement of the electric motor to be precisely detected by the detector.

2. The Oldham coupling according to claim 1, wherein the fitting indication portions of the first coupling part and of the second coupling part are defined by shapes of the first coupling part and of the second coupling part for fitting on the fitting portions of the intermediate part, respectively, and wherein the fitting indication portions of the intermediate part are defined by shapes of the pair of fitting portions.

3. The Oldham coupling according to claim 1, wherein the fitting indication portions of the first coupling part and of the second coupling part are protrusions or recesses on the first coupling part and on the second coupling part, respectively, and the fitting indication portions of the intermediate part are recesses or protrusions on the intermediate part which are adapted to be fitted on the protrusions or the recesses of the first coupling part and of the second coupling part, respectively.

4. The Oldham coupling according to claim 1, wherein the fitting indication portions of the first coupling part, of the second coupling part and of the intermediate part are magnetic portions for providing a magnetic action between the first coupling part and the intermediate part and between the second coupling part and the intermediate part.

5. The Oldham coupling according to claim 1, wherein the fitting indication portions of the first coupling part, of the second coupling part and of the intermediate part are recesses on the first coupling part, on the second coupling part and on the intermediate part, respectively, and a connecting member is provided between the recesses of the first coupling part and of the intermediate part and between the recesses of the second coupling part and of the intermediate part, respectively.

6. A manufacturing process for manufacturing an Oldham coupling, comprising:
preparing a first coupling part adapted to be fixed on a rotational shaft of an electric motor;
preparing a second coupling part adapted to be fixed on a rotational shaft of a detector for detecting information on rotational movement of the electric motor;
preparing an intermediate part adapted to be provided between the first coupling part and the second coupling part, the intermediate part including a pair of fitting portions extending perpendicular to each other, the fitting portion on one end surface of the intermediate part being adapted to be fitted on the first coupling part, the fitting portion on the other end surface of the intermediate part being adapted to be fitted on the second coupling part, the first coupling part, the second coupling part, and the intermediate part having a fitting indication portion for determining a positional relationship between the first coupling part and the second coupling part about a rotational axis, respectively, such that a reference position of the rotational shaft of the electric motor and a reference position of the rotational shaft of the detector match each other, thereby allowing information on rotational movement of the electric motor to be precisely detected by the detector; and
fitting the first coupling part and the second coupling part on the intermediate part, based on the fitting indication portions.

7. A coupling process for coupling a rotational shaft of an electric motor and a rotational shaft of a detector to each other by the Oldham coupling according to claim 1, wherein the fitting indication portions of the first coupling part, of the second coupling part and of the intermediate part are visually recognizable marks, respectively,
wherein the process comprises positioning the first coupling part, the second coupling part, and the intermediate part in relation to one another such that the fitting indication portion of the intermediate part is situated between the fitting indication portions of the first coupling part and of the second coupling part.

8. An electric motor comprising the Oldham coupling according to claim 1.

* * * * *